L. V. McLAUGHLIN.
PULLEY ATTACHMENT FOR AUTOMOBILES.
APPLICATION FILED MAR. 30, 1921.
1,378,703.
Patented May 17, 1921.
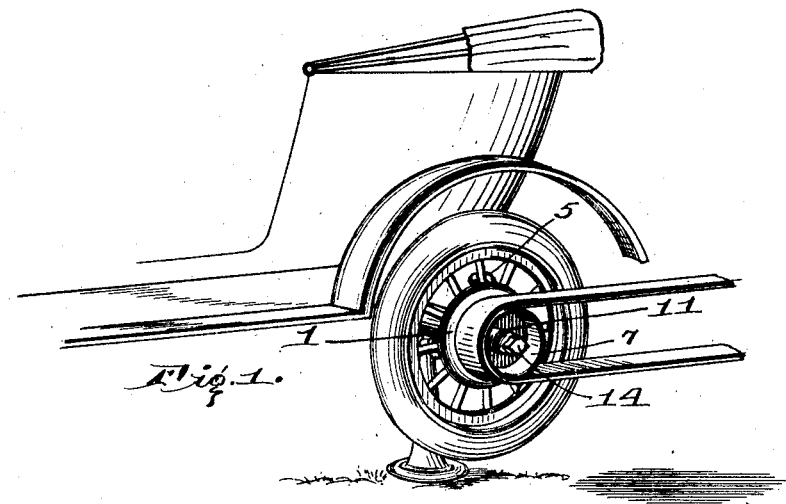
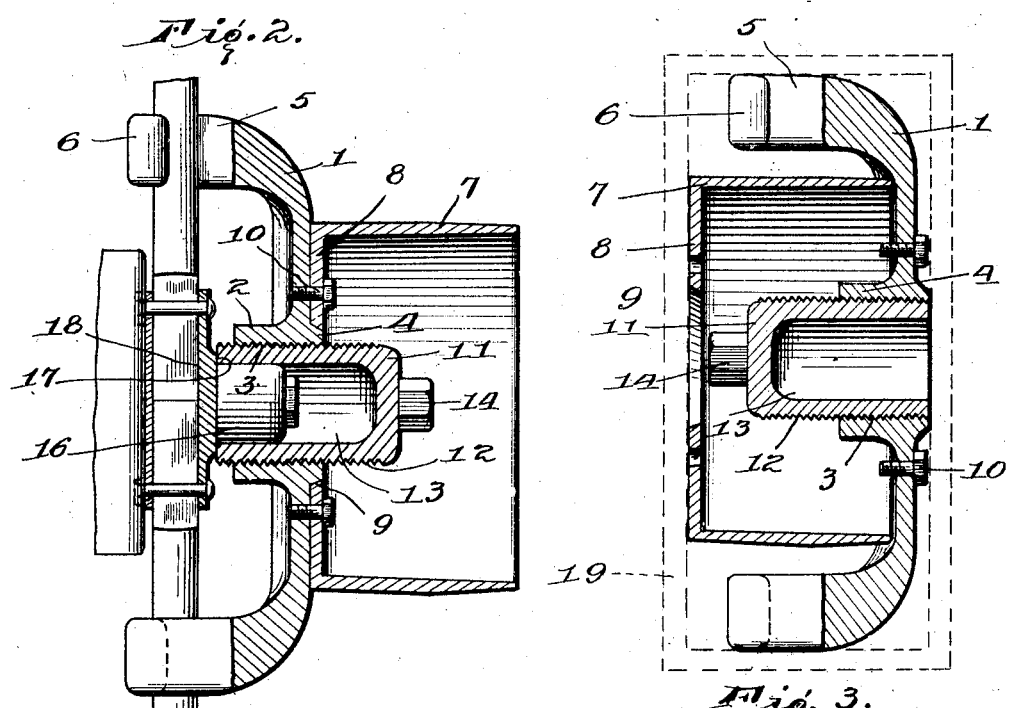

UNITED STATES PATENT OFFICE.

LEO VINCENT McLAUGHLIN, OF CHESTER, PENNSYLVANIA.

PULLEY ATTACHMENT FOR AUTOMOBILES.

1,378,703.   Specification of Letters Patent.   Patented May 17, 1921.

Application filed March 30, 1921. Serial No. 456,891.

*To all whom it may concern:*

Be it known that I, LEO V. McLAUGHLIN, a citizen of the United States, residing at Chester, in the county of Delaware and State of Pennsylvania, have invented certain new and useful Improvements in Pulley Attachments for Automobiles, of which the following is a specification.

My invention relates to certain new and useful improvements in pulley attachments for application to automobile drive wheels, when it is desired to use the automobile power for driving machinery of one kind or another.

In its general nature, my invention comprises a body member having a threaded hub and a plurality of spider-like arms provided with hook ends adapted to engage between and over the spokes of the rear wheel of an automobile, a drum pulley being removably secured to the body of the spider member, there being also a cup-like threaded member tapped into the hub of the body of the spider member and adapted to slip over the hub cap of the rear wheel and engage against the outer face of the hub adjacent to the cap, the hollow screw member having a part projected into the pulley on which a suitable wrench may be placed for tightening up the device on the wheel.

In its more detail nature, the invention includes those novel features of construction, combination and arrangement of parts, all of which will be fully explained in the following description and specifically pointed out in the appended claims, reference being had to the accompanying drawings, in which:

Figure 1 is a perspective view illustrating the invention in use.

Fig. 2 is a vertical section of the same.

Fig. 3 is a vertical section illustrating the position of the parts when assembled for shipment.

In further reference to the drawings in which like numerals and letters of reference indicate like parts in all of the figures, 1 is the body portion of the spider member which is provided with a hub 2 bored and internally threaded as at 3 and shouldered at 4, the body member 1 carrying arms 5 with hook ends 6 that are adapted to pass between and hook around the spokes 15 of the wheel.

In order to hold the hooks 6 in engagement with the spokes and maintain the spider member 1 in an immovable position with regard to the wheel and in order at the same time to center the axis of the device in alinement with the axis of the wheel, I provide a hollow threaded bell member 11 which is chambered at 13 to fit snugly over the hub cap 16 and is externally threaded at 12 to engage the threads 3 of the hub 2 of the spider member.

The threaded bell member 11 is provided with a nut-like body 14 on which a suitable wrench may be placed to screw the member 11 with its front end against the shoulder 17 of the hub 18 of the wheel, as clearly shown in Fig. 2 of the drawings.

7 is the power pulley which may be of any desired form but is provided with a web 8 bored and shouldered at 9 to fit over the shoulder 4 of the member 1, to which member the pulley is secured by suitable cap screws 10.

When the parts are placed on the machine for use, the rear axle is, of course, jacked up to lift the wheel free from the ground and the parts are positioned as shown in Figs. 1 and 2, power may then be taken off the pulley 7 by a belt or in any other usual way.

When it is desired to ship the parts constituting my invention, the pulley 7 is removed by removal of the cap screws 10 and the bell screw 11 is reversed in the hub 2 and the pulley 7 is located within the confines of the spider arms 6, as best shown in Fig. 3, and the whole is then placed in a suitable box 19 where it takes up but little space for shipment, or for storage in the machine in case it is desired to carry the equipment along on a journey.

I am aware that heretofore similar devices have been provided and I do not, therefore, broadly claim a pulley attachment for automobiles but what I do claim and desire to secure by Letters Patent is:

1. In an apparatus of the class described, a spider member comprising a body, a hub portion and hook arms adapted to engage the spokes of the wheel, a threaded bell member in threaded engagement with the hub of the spider member and chambered to fit over the hub cap of the wheel and engage the shoulder of the hub adjacent thereto, a pulley member secured to said spider member and means on said bell-screw member for receiving a wrench by which it may be turned.

2. In apparatus of the class described, a spider member comprising a body having a hub and hook arms for engaging the spokes of the wheel, said hub being internally threaded, a pulley member removably secured to the body portion of said spider member and having a web apertured to receive the hub of said spider member, a bell-screw threaded into said spider member hub and chambered to fit over the hub cap of a wheel and engage the shoulder of the hub of the wheel adjacent to the hub cap, said bell-screw projecting into said pulley and having provisions by which it may be turned.

3. In apparatus of the class described, a spider member comprising a body having a hub and hook arms for engaging the spokes of the wheel, said hub being internally threaded, a pulley member removably secured to the body portion of said spider member and having a web apertured to receive the hub of said spider member, a bell-screw threaded into said spider member hub and chambered to fit over the hub cap of a wheel and engage the shoulder of the hub of the wheel adjacent to the hub cap, said bell-screw projecting into said pulley and having provisions by which it may be turned, said pulley being of a lesser diameter than the diameter of the space between the hook arms of said spider member, whereby when the parts are assembled for shipment, the pulley member may be embraced by said arms for the purposes stated.

LEO VINCENT McLAUGHLIN.